UNITED STATES PATENT OFFICE.

STANLEY JOHN PEACHEY, OF HEATON CHAPEL, STOCKPORT, ENGLAND.

PROCESS FOR ACCELERATING THE VULCANIZATION OF NATURAL OR ARTIFICIAL CAOUTCHOUC OR CAOUTCHOUC-LIKE SUBSTANCES.

1,157,177.

Specification of Letters Patent. Patented Oct. 19, 1915.

No Drawing. Application filed February 12, 1915. Serial No. 7,805.

*To all whom it may concern:*

Be it known that I, STANLEY JOHN PEACHEY, a subject of the King of Great Britain and Ireland, and resident of Heaton Chapel, Stockport, England, have invented a Process for Accelerating the Vulcanization of Natural or Artificial Caoutchouc or Caoutchouc-like Substances, of which the following is a specification.

This invention refers to the vulcanization of caoutchouc, natural or artificial, or caoutchouc-like substances, and has for its object to obtain the desired vulcanization in a much shorter time than is possible with the ordinary method, while obtaining a well vulcanized product.

According to the invention, there is added to the india-rubber or rubber-like substance, prior to vulcanization with sulfur, a small quantity of paranitrosodimethylanilin or its homologues such as paranitrosomethylanilin, or paranitosoethylanilin. By the addition of either of these substances, in an appropriate quantity, to the india-rubber mixing, prior to vulcanization, and then heating the mixture, to the vulcanizing temperature, by any suitable method, a well vulcanized product is obtained, in a far shorter time than is required with the ordinary method of vulcanization and with the said accelerating agent absent. The isomeric nitrosamines produce no appreciable acceleration of the process of vulcanization.

The following is one example of proportions, viz: 100 parts by weight of plantation rubber. 10 parts by weight of sulfur. 0.5 part by weight of the accelerating agent.

The mixing is heated to from 135° C. to 145° C. and the vulcanization is complete in about 20 minutes. Without the addition of the accelerating agent the time of vulcanization is about one hour. A similar result is obtained if the plantation rubber is replaced by Pará rubber, or by artificial caoutchouc.

Another example of proportions is as follows:—100 parts by weight of plantation rubber. 40 parts by weight of sulfur. 0.75 to 1.0 part by weight of accelerating agent.

The mixing is heated for 2 hours at a temperature of about 145° C., and the resulting product is a hard and durable vulcanite. To obtain similar results in the ordinary way and without the addition of the accelerating agent, the time of vulcanization is about 6 hours. Other kinds of india-rubber, including artificial caoutchouc, give similar results.

The foregoing proportions are only given by way of example, and I do not confine myself thereto, as variations may be made without departing from the invention.

What I claim is:—

1. Accelerating the vulcanization of natural or artificial caoutchouc or caoutchouc-like substances by vulcanizing the same in the presence of paranitrosodimethylanilin or of its homologues.

2. Accelerating the vulcanization of natural or artificial caoutchouc or caoutchouc-like substances by vulcanizing the same in the presence of paranitrosodimethylanilin or of its homologues, substantially as set forth in the examples herein given.

In witness whereof I have hereunto set my hand in the presence of two witnesses.

STANLEY JOHN PEACHEY.

Witnesses:
 FRED. C. PENNINGTON,
 FRED. J. MEREDITH.